United States Patent
Abraham et al.

(10) Patent No.: US 8,989,106 B2
(45) Date of Patent: Mar. 24, 2015

(54) METHODS AND APPARATUSES FOR SCHEDULING UPLINK REQUEST SPATIAL DIVISION MULTIPLE ACCESS (RSDMA) MESSAGES IN AN SDMA CAPABLE WIRELESS LAN

(75) Inventors: Santosh P. Abraham, San Diego, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 753 days.

(21) Appl. No.: 12/712,968

(22) Filed: Feb. 25, 2010

(65) Prior Publication Data
US 2010/0220679 A1    Sep. 2, 2010

Related U.S. Application Data

(60) Provisional application No. 61/156,360, filed on Feb. 27, 2009.

(51) Int. Cl.
*H04W 72/04*    (2009.01)
*H04W 74/06*    (2009.01)
*H04W 74/08*    (2009.01)

(52) U.S. Cl.
CPC .......... *H04W 74/06* (2013.01); *H04W 74/0808* (2013.01)
USPC .......................................... 370/329; 370/462

(58) Field of Classification Search
CPC ..................... H04W 72/1205; H04W 72/046
USPC ........... 370/328, 335, 350, 329; 455/424, 502
See application file for complete search history.

(56) References Cited

U.S. PATENT DOCUMENTS 8,483,105 B2    7/2013    Nanda et al.
2005/0147023 A1*    7/2005    Stephens et al. .............. 370/203

(Continued)

FOREIGN PATENT DOCUMENTS

CN    1894914 A    1/2007
CN    1926830 A    3/2007

(Continued)

OTHER PUBLICATIONS

"IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications Amendment 8: Medium Assess Control (MAC) Qua" IEEE Standard; [IEEE Standard], IEEE, Piscataway, NJ, USA, Jan. 1, 2005, pp. 1-189, XP017603828.

(Continued)

*Primary Examiner* — Pao Sinkantarakorn
*Assistant Examiner* — Richard Chang
(74) *Attorney, Agent, or Firm* — Kevin T. Cheatham

(57) ABSTRACT

An apparatus for wireless communications, including a processing system configured to receive requests for a spatial division multiplexed transmission from a plurality of nodes over a multiple access medium; and initiate the spatial division multiplexed transmission based on a metric related to one or more of the nodes, is disclosed. Another apparatus for wireless communications, including a processing system configured to generate data belonging to an access class having contention parameters; and precode at least a portion of the data for transmission over a spatial stream and enter into post backoff following the spatial stream transmission, is also disclosed. Methods for using the apparatuses are also disclosed.

47 Claims, 14 Drawing Sheets

(56) References Cited

U.S. PATENT DOCUMENTS

| | | |
|---|---|---|
| 2005/0157695 A1 | 7/2005 | Stephens et al. |
| 2007/0153760 A1* | 7/2007 | Shapira ............................ 370/350 |
| 2007/0274256 A1 | 11/2007 | Murai et al. |
| 2007/0286149 A1* | 12/2007 | Yamamoto et al. ............ 370/345 |
| 2009/0016263 A1* | 1/2009 | Kishigami et al. ............. 370/328 |
| 2009/0059880 A1* | 3/2009 | Kuroda ............................ 370/338 |
| 2009/0082028 A1* | 3/2009 | Hosein et al. .................. 455/450 |
| 2009/0086706 A1* | 4/2009 | Huang et al. ................... 370/349 |
| 2009/0088174 A1* | 4/2009 | Kikuchi et al. ................. 455/450 |
| 2009/0232112 A1* | 9/2009 | Trainin et al. .................. 370/337 |
| 2010/0008331 A1* | 1/2010 | Li et al. .......................... 370/335 |

FOREIGN PATENT DOCUMENTS

| | | |
|---|---|---|
| CN | 101087182 A | 12/2007 |
| EP | 1641180 A1 | 3/2006 |
| EP | 1662712 A1 | 5/2006 |
| EP | 1887735 | 2/2008 |
| JP | 2005064795 A | 3/2005 |
| JP | 2006148919 A | 6/2006 |
| JP | 2007502074 A | 2/2007 |
| JP | 2007502076 A | 2/2007 |
| JP | 2007520118 A | 7/2007 |
| JP | 2007318576 A | 12/2007 |
| WO | WO2005015844 | 2/2005 |
| WO | WO2005015846 A2 | 2/2005 |
| WO | WO-2005039127 A1 | 4/2005 |
| WO | WO2005039133 | 4/2005 |
| WO | WO-2005067247 A1 | 7/2005 |
| WO | WO-2008094630 A2 | 8/2008 |
| WO | WO2010022091 | 2/2010 |

OTHER PUBLICATIONS

IEEE Standards Department: "Draft Supplement to Standard for Telecommunications and Information Exchange Between Systems; LAN/MAN specific requirements; part 11; Wireless Medium Access Control (MAC) and Physical Layer (PHY) Specifications; Medium Access Control (MAC) Enhancements for Quality of Service (QoS)" vol. IEEE 802.11e, No. D4.3, pp. 1-131, XP002517540.

International Search Report and Written Opinion—PCT/US2010/025674, International Search Authority—European Patent Office—Jul. 6, 2010.

Partial International Search Report—PCT/US2010/25674—International Search Authority, European Patent Office, Jun. 4, 2010.

Sheng Zhou et al: "An Uplink Medium Access Protocol with SDMA Support for Multiple-Antenna WLANs" Wireless Communications and Networking Conference, 2008. WCNC 2008. IEEE, IEEE, Piscataway, NJ, USA, Mar. 31, 2008, pp. 1809-1814, XP031243907.

Taiwan Search Report—TW099105933—TIPO—Dec. 15, 2013.

* cited by examiner

| FC | Duration/ID | DA (Broadcast) | SA | #STAs per Slot | MAX ID | Bitmap | CRC |
|----|-------------|----------------|----|----|----|----|----|
| 602 | 604 | 606 | 608 | 610 | 612 | 614 | 616 |

| 248 | 249 | 250 | 251 | 252 | 253 | 254 | 255 |
|-----|-----|-----|-----|-----|-----|-----|-----|
| 0 | 0 | 1 | 0 | 1 | 1 | 0 | 1 |

...

| 0 | 1 | 2 | 3 | 4 | 5 | 6 | 7 |
|---|---|---|---|---|---|---|---|
| 1 | 1 | 0 | 0 | 1 | 0 | 0 | 1 |

METHODS AND APPARATUSES FOR SCHEDULING UPLINK REQUEST SPATIAL DIVISION MULTIPLE ACCESS (RSDMA) MESSAGES IN AN SDMA CAPABLE WIRELESS LAN

CLAIM OF PRIORITY UNDER 35 U.S.C. §119

The present application for Patent claims priority to Provisional Application No. 61/156,360, entitled "Method and Apparatus for Scheduling Uplink RSDMA Messages in a SDMA Capable Wireless LAN" filed Feb. 27, 2009, and assigned to the assignee hereof and hereby expressly incorporated by reference herein.

BACKGROUND

I. Field

The following description relates generally to communication systems, and more particularly to methods and apparatuses for scheduling uplink request Spatial Division Multiple Access (RSDMA) messages in an SDMA capable wireless LAN.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In communication systems, Medium Access Control (MAC) protocols are designed to operate to exploit several degrees of freedom offered by the air link medium. The most commonly exploited degrees of freedom are time and frequency. For example, in the IEEE 802.11 MAC protocol, the time degree of freedom is exploited through the CSMA (Carrier Sense Multiple Access). The CSMA protocol attempts to ensure that no more than one transmission occurs in a neighborhood of potential high interference. The frequency degree of freedom can be exploited by using different channels.

Recent developments have led to space dimension being a viable option. Spatial Division Multiple Access (SDMA) can be used for improving utilization of the air link by scheduling multiple terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. The receivers may also have one or more antennas, such as in MIMO or Single Input-Multiple Output (SIMO) antenna systems. In one example, the transmitter may be an access point (AP) and the receivers may be stations (STAs). The streams are formed at the AP such that a stream targeted at a particular STA, for example, may be seen as low power interference at other STAs, which will not cause significant interference and not be ignored.

It is desirable that the process of scheduling uplink SDMA transmissions by each STA during each uplink SDMA transmission cycle, or epoch, be performed in a manner so as to ensure fair access by all the STAs to the network medium for data transmission. Simultaneously, given that certain types of data, such as voice over IP or streaming multimedia, requires a certain priority of transmission, it is desirable that the AP schedules uplink SDMA transmissions such that any Quality of Service (QoS) levels are maintained. Further, it is also desirable that the scheduling does not consume significant amounts of processing and timing overhead from the AP. Frequent scheduling of uplink SDMA may lead to poor efficiency in the operation of the AP if only few STAs participate in each uplink transmission.

Consequently, it would be desirable to address one or more of the deficiencies described above.

SUMMARY

The following presents a simplified summary of one or more aspects of an uplink SDMA scheduling approach in order to provide a basic understanding of such aspects of the scheduling approach. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide wireless communications, where an apparatus for wireless communications includes a processing system configured to receive requests for a spatial division multiplexed transmission from a plurality of nodes over a multiple access medium; and initiate the spatial division multiplexed transmission based on a metric related to one or more of the nodes.

In another aspect, an apparatus for wireless communications is provided that includes means for receiving requests for a spatial division multiplexed transmission from a plurality of nodes over a multiple access medium; and means for initiating the spatial division multiplexed transmission based on a metric related to one or more of the nodes.

In yet another aspect, a method for wireless communications is provided that includes receiving requests for a spatial division multiplexed transmission from a plurality of nodes over a multiple access medium; and initiating the spatial division multiplexed transmission based on a metric related to one or more of the nodes.

In yet another aspect, a computer-program product for communication is provided that includes a machine-readable medium encoded with instructions executable to receive requests for a spatial division multiplexed transmission from a plurality of nodes over a multiple access medium; and initiate the spatial division multiplexed transmission based on a metric related to one or more of the nodes; and a transceiver configured to interface the processing system to the medium through the antennas.

In yet another aspect, an access point is provided that includes a plurality of antennas; a processing system configured to receive requests for a spatial division multiplexed transmission from a plurality of nodes over a multiple access medium; and initiate the spatial division multiplexed transmission based on a metric related to one or more of the nodes; and a transceiver configured to interface the processing system to the medium through the antennas.

In yet another aspect, an apparatus is provided that includes a processing system configured to generate data belonging to an access class having contention parameters; and precode at least a portion of the data for transmission over a spatial stream and enter into post backoff following the spatial stream transmission.

In yet another aspect, an apparatus is provided that includes means for generating data belonging to an access class having contention parameters; means for precoding at least a portion of the data for transmission over a spatial stream; and means for entering into post backoff following the spatial stream transmission.

In yet another aspect, a method for wireless communications is provided that includes generating data belonging to an access class having contention parameters; precoding at least a portion of the data for transmission over a spatial stream; and entering into post backoff following the spatial stream transmission.

In yet another aspect, a computer-program product for communication is provided that includes a machine-readable medium encoded with instructions executable to generate data belonging to an access class having contention parameters; precode at least a portion of the data for transmission over a spatial stream; and enter into post backoff following the spatial stream transmission.

In yet another aspect, a station is provided that includes a user interface; and s processing system configured to generate data in response to the user interface, the data belonging to an access class having contention parameters, and precode at least a portion of the data for transmission over a spatial stream and enter into post backoff following the spatial stream transmission.

BRIEF DESCRIPTION OF THE DRAWINGS

FIG. 6 illustrates an example of a Request SDMA (RS-DMA) frame format that may be used in the uplink SDMA frame exchange sequence;

FIG. 7 illustrates an example of a bitmap field format that may be used in the RSDMA frame format;

Figure 1:
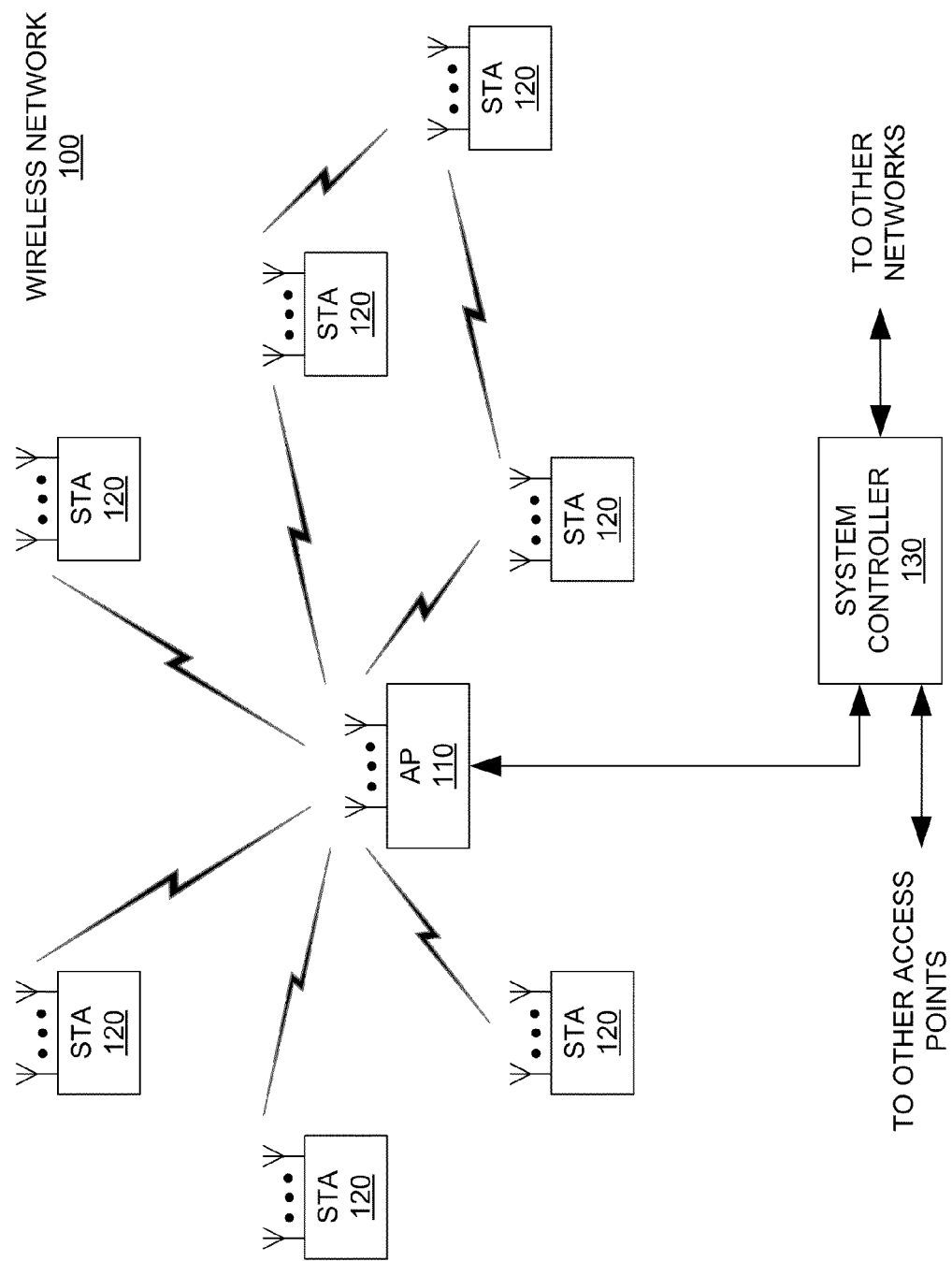
FIG. 1 is a diagram of a wireless communications network in which a downlink/uplink Spatial Division Multiple Access (SDMA) scheduler may be used.

In accordance with common practice, the drawings may be simplified for clarity. Thus, the drawing may not depict all of the components of a given apparatus (e.g., device) or method.

DETAILED DESCRIPTION

Various aspects of an uplink SDMA transmission process are described more fully hereinafter with reference to the accompanying drawings. The various aspects may, however, be embodied in many different forms and should not be construed as limited to any specific structure or function presented throughout this disclosure. Rather, these aspects are provided so that this disclosure will be as thorough and complete as possible. Based on the teachings herein, one skilled in the art should appreciate that that the scope of the scheduler is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the scheduler set forth herein. It should be understood that any aspect of the scheduler described herein may be embodied by one or more elements of a claim.

Several aspects of a wireless network will now be presented with reference to FIG. 1. The wireless network, which is also referred to herein as a basic service set (BSS) 100, is shown with several wireless nodes, generally designated as an access point (AP) 110 and a plurality of access terminals or stations (STAs) 120. Each wireless node is capable of receiving and/or transmitting. In the detailed description that follows, the term "access point" is used to designate a transmitting node and the term "STA" is used to designate a receiving node for downlink communications, whereas the term "AP" is used to designate a receiving node and the term "STA" is used to designate a transmitting node for uplink communications. However, those skilled in the art will readily understand that other terminology or nomenclature may be used for an AP and/or STA. By way of example, an AP may be referred to as a base station, a base transceiver station, a wireless device, a terminal, a node, a wireless node, an access terminal, or an STA acting as an AP, or some other suitable terminology. Similarly, an STA may be referred to as a user terminal, a mobile station, a subscriber station, a wireless device, an access terminal a terminal, a node, a wireless node, or some other suitable terminology. The various concepts described throughout this disclosure are intended to apply to all suitable apparatuses regardless of their specific nomenclature.

The wireless network 100 may support any number of APs distributed throughout a geographic region to provide coverage for the STAs 120. A system controller 130 may be used to provide coordination and control of the APs, as well as access to other networks (e.g., Internet) for the STAs 120. For simplicity, one AP 110 is shown. An AP is generally a fixed terminal that provides wired network services to STAs in the geographic region of coverage. However, the AP may be mobile in some applications. An STA, which may be fixed or mobile, utilizes the backhaul services of an AP or engages in peer-to-peer communications with other STAs. Examples of STAs include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, the AP 110 may communicate with multiple STAs 120 simultaneously using SDMA. SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the STAs 120 with different spatial signatures, which enables each STA 120 to recover the data stream destined for that STA 120. On the uplink, each STA 120 transmits a spatially precoded data stream, which enables the AP 110 to identify the source of each spatially precoded data stream. It should be noted that although the term "precoding" is used herein, in general, the term "coding" may also be used to encompass the process of precoding, encoding, decoding and/or postcoding a data stream.

One or more STAs 120 may be equipped with multiple antennas to enable certain functionality. With this configuration, for example, multiple antennas at the AP 110 may be used to communicate with a multiple antenna STA to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe STAs that also support MIMO technology, the AP 110 may also be configured to support STAs that do not support MIMO technology. This approach may allow older versions of STAs (i.e., "legacy" terminals) to remain deployed in a wireless network, extending their useful lifetime, while allowing newer MIMO STAs to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

In one aspect of the disclosure, the wireless network supports SDMA communication conforming to the IEEE 802.11e standard. IEEE 802.11e-2005, or simply, 802.11e, is an approved amendment to the IEEE 802.11 standard that defines a set of Quality of Service (QoS) enhancements for wireless LAN applications. The standard is directed to delay-sensitive applications, such as voice over wireless IP and streaming multimedia.

The IEEE 802.11e standard provides for Enhanced Distribution Coordination Access (EDCA), where high priority traffic has a higher chance of being sent than low priority traffic, with the goal being that a STA with high priority traffic to send generally waits a little less before it sends its packet, on average, than a STA with low priority traffic to send. EDCA introduces the concept of traffic categories, or classes. Using EDCA, STAs try to send data after detecting that the medium is idle for a set time period. The set time period is based on a corresponding traffic category. A higher-priority traffic category will have a shorter wait time than a lower-priority traffic category. While no guarantees of service are provided, EDCA establishes a probabilistic priority mechanism to allocate bandwidth based on traffic categories. The IEEE 802.11e EDCA standard provides QoS differentiation by grouping traffic into four access classes (ACs). Specifically, these include voice, video, best effort and background classes. The voice AC has the highest priority; the video AC has the second highest priority; the best effort AC has the third highest priority; and the background AC has the lowest priority. Each AC has its own set of medium access parameters. Specifically, EDCA traffic prioritization uses the following medium access parameters—Arbitration Interframe Space (AIFS) interval, contention window (CW), and transfer opportunity (TXOP). Each of these will be explained herein.

Generally, the AIFS is the time interval that a station must sense the medium to be idle before invoking a backoff or transmission. A higher priority AC uses a smaller AIFS interval. The contention window (CW) indicates the number of backoff time slots until the station can access the medium. CW starts from a minimum CW value, CWmin, and doubles every time a transmission fails until it reaches its maximum value, CWmax. Then, CW holds its maximum value until the transmission exceeds its retry limit. A higher priority AC uses a smaller CWmin and CWmax. The TXOP indicates the maximum duration that an AC can be allowed to transmit frames after acquiring access to the medium. To save contention overhead, multiple frames can be transmitted within one acquired TXOP without any additional contention, as long as the total transmission time does not exceed the TXOP duration.

To reduce the probability of two STAs colliding, because the two STAs cannot hear each other when they are both transmitting, the standard defines a virtual carrier sense mechanism. Before an STA initiates a transaction, the STA first transmits a short control packet called RTS (Request To Send), which includes the source address, the destination address and the duration of the upcoming transaction (i.e., the data packet and the respective ACK). Then, the destination STA responds (if the medium is free) with a response control packet called CTS (Clear to Send), which includes the same duration information. All STAs receiving either the RTS and/or the CTS set a virtual carrier sense indicator, i.e., the Network Allocation Vector (NAV), for the given duration, and use the NAV together with the physical carrier sense when sensing the medium. This mechanism reduces the probability of a collision in the receiver area by a STA that is "hidden" from the transmitter STA to the short duration of the RTS transmission, because the STA hears the CTS and "reserves" the medium as busy until the end of the transaction. The duration information in the RTS also protects the transmitter area from collisions during the ACK from STAs that are out of range of the acknowledging STA. Due to the fact that the RTS and CTS are short frames, the mechanism reduces the overhead of collisions, since these frames are recognized more quickly than if the whole data packet was to be transmitted (assuming the data packet is bigger than RTS). The standard allows for short data packets, i.e., those shorter than an RTS Threshold, to be transmitted without the RTS/CTS transaction.

Using these medium access parameters described above, EDCA works in the following manner. Before a transmitting STA can initiate any transmission, the transmitting STA must first sense the channel idle (physically and virtually) for at least an AIFS time interval. If the channel is idle after the AIFS interval, the transmitting STA invokes a backoff procedure using a backoff counter to count down a random number of backoff time slots. The transmitting STA decrements the backoff counter by one each period as long as the channel is sensed to be idle. Once the backoff counter reaches zero, the transmitting STA initiates an RTS transmission and awaits a CTS transmission from the receiving STA. If the transmitting STA receives a CTS transmission from the receiving STA, the transmitting STA initiates the transaction. The STA can initiate multiple frame transmissions without additional contention as long as the total transmission time does not exceed the TXOP duration.

If the transmitting STA senses the channel to be busy at any time during the backoff procedure, the transmitting STA suspends its current backoff procedure and freezes its backoff counter until the channel is sensed to be idle for an AIFS interval again. Then, if the channel is still idle, the transmitting STA resumes decrementing its remaining backoff counter. After each unsuccessful transmission, CW doubles until CWmax. After a successful transmission, CW to CWmin. The level of QoS control for each AC is determined by the combination of the medium access parameters and the number of competing STAs in the network.

Keeping in mind the above information regarding EDCA, the operation of an AP in accordance with one aspect of the disclosure to provide for the use of uplink Request SDMA (RSDMA) messages, also referred to as frames, in a wireless network will now be described. The use of the RSDMA messages provides a mechanism to allow the AP to poll a plurality of assorted STAs for uplink traffic so that the AP may fairly assign resources to each STA. Specifically, in one example, the approach described herein provides a protocol for allowing the AP to use uplink RSDMA messages in manner that complies with EDCA while attempting to preserve fairness in allowing all STAs access to the wireless network to achieve a desired QoS level for each of the STAs.

Figure 2:
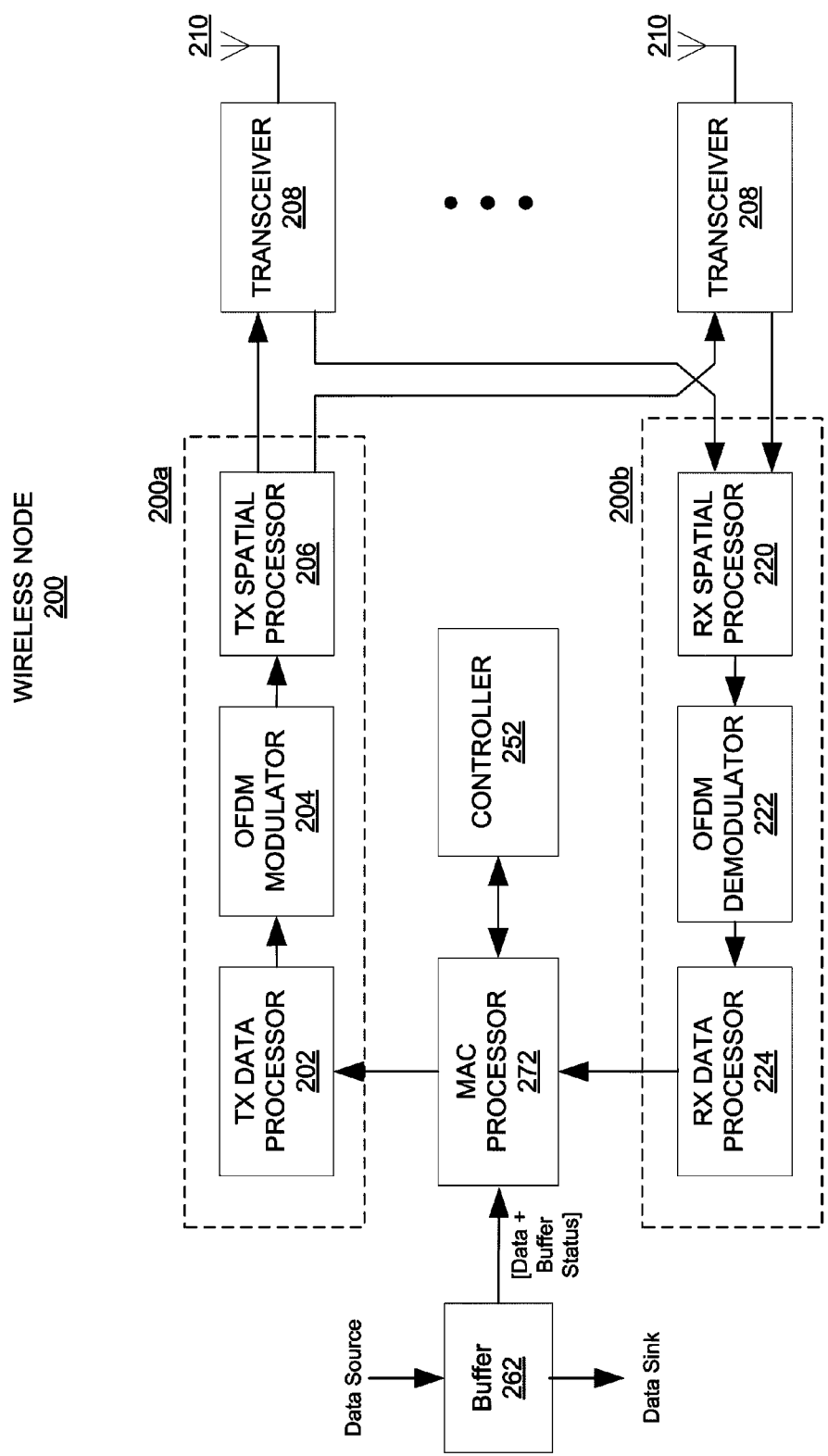
FIG. 2 is a block diagram of an example of a wireless node in the wireless communications network of FIG. 1 that includes a controller for scheduling Uplink Request SDMA transmission.

FIG. 2 is a conceptual block diagram illustrating an example of the signal processing modules of a wireless node 200 that may be used to implement the various aspects of the scheduler. The wireless node includes a Media Access Control (MAC) processor 272 that receives data from a data source and returns data to a data sink, both through a buffer 262. Those skilled in the art would understand that the MAC processor 272 may be configurable to control access to the medium. In one aspect of the MAC processor 272, the processor may be compliant with the IEEE 802.11 standard in generating and decoding MAC frames that may be used with a shared medium. The data source and data sink represent data coming from and going to, respectively, the layers above the MAC layer, such as the transport layer or the application layer. The MAC processor 272 operates with a transmit chain 200a in the wireless node 200 to transmit, and a receive chain 200b to receive, MAC frames. The transmit chain 200a and the receive chain 200b are part of the PHY layer, which provides physical signal and control, and may be implemented in a variety of approaches.

In one aspect, during the operation in the transmit chain, the buffer 262 is coupled to the MAC processor 272 to buffer any data to be, but which has not been, transmitted. The buffer 262 compensates for a difference in the rate of flow of data. In one aspect of the disclosure, data for different classes of traffic may be stored in the buffer 262. For example, the buffer 262 may store the four classes of data that IEEE 802.11e specifies may be transmitted, but have not been because of network congestion, processing delays, or EDCA contention. In one aspect of the disclosure, the buffer 262 may be controlled by the controller 272 as well as the TX data processor 202. The buffer 262 may be cleared in part or whole of any stale data, which is data that may be discarded if it is no longer relevant. For example, if video data is being buffered and the rate at which the transmit chain is transmitting cannot keep up with the rate at which the buffer is being filled, then video data that has been stored in the buffer the longest may be discarded. Further, the buffer 262 may provide information regarding its status, which may include how much data it is storing, separated by class. For example, where the wireless node 200 is an STA, the status of the buffer 262 may be requested by the AP as disclosed herein.

Turning to the transmit chain 200a, in a transmit mode, a TX data processor 202 may be used to receive data from the data source through the MAC processor 272 and encode (e.g., Turbo code) the data to facilitate forward error correction (FEC) at the receiving node. The encoding process results in a sequence of code symbols that may be blocked together and mapped to a signal constellation by the TX data processor 202 to produce a sequence of modulation symbols. The TX data processor 202 may include one or more memory elements to act as a buffer during processing in the transmit chain. The memory may be implemented in a variety of hardware as known by those skilled in the art.

In wireless nodes implementing OFDM, the modulation symbols from the TX data processor 202 may be provided to an OFDM modulator 204. The OFDM modulator 204 splits the modulation symbols into parallel streams. Each stream is then mapped to an OFDM subcarrier and then combined using an Inverse Fast Fourier Transform (IFFT) to produce a time domain OFDM stream.

A TX spatial processor 206 performs spatial processing on the OFDM stream. This may be accomplished by spatially precoding each OFDM stream and then providing each spatially precoded stream to a different antenna 210 via a transceiver 208. Each transceiver 208 modulates an RF carrier with a respective precoded stream for transmission over the wireless channel.

Turning to the receive chain 200b, in a receive mode, each transceiver 208a-208n receives a signal through its respective antenna 210a-210n. Each transceiver 208a-208n may be used to recover the information modulated onto an RF carrier and provide the information to a RX spatial processor 220.

The RX spatial processor 220 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 220.

In wireless nodes implementing OFDM, the stream (or combined stream) from the RX spatial processor 220 is provided to an OFDM demodulator 222. The OFDM demodulator 222 converts the stream (or combined stream) from time-domain to the frequency domain using a Fast Fourier Transform (FFT). The frequency domain signal comprises a separate stream for each subcarrrier of the OFDM signal. The OFDM demodulator 222 recovers the data (i.e., modulation symbols) carried on each subcarrier and multiplexes the data into a stream of modulation symbols.

A RX data processor 224 may be used to translate the modulation symbols back to the correct point in the signal constellation. Because of noise and other disturbances in the wireless channel, the modulation symbols may not correspond to an exact location of a point in the original signal constellation. The RX data processor 224 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 224 then uses the sequence of code symbol LLRs in order to decode the data that was originally transmitted before providing the data to the MAC layer. The RX data processor 224 may include one or more memory elements to act as a buffer during the processing in the receiver chain.

Wireless node 200 also includes a controller 252 for scheduling uplink RSDMA messages in an SDMA-capable wireless LAN, as described further herein. In one aspect of the controller 252, the controller 252 is coupled to the RX data processor 214 to receive the information, metrics, and measurements described further herein to perform its calculations. For example, in various aspects of the operation of the controller 252, as further described herein, sounding frames are used to measure the Channel State Information (CSI) between two devices such as an AP and a STA. The controller 252 may use the receiver chain to retrieve the information it needs related to the sounding frame measurements.

Figure 3:
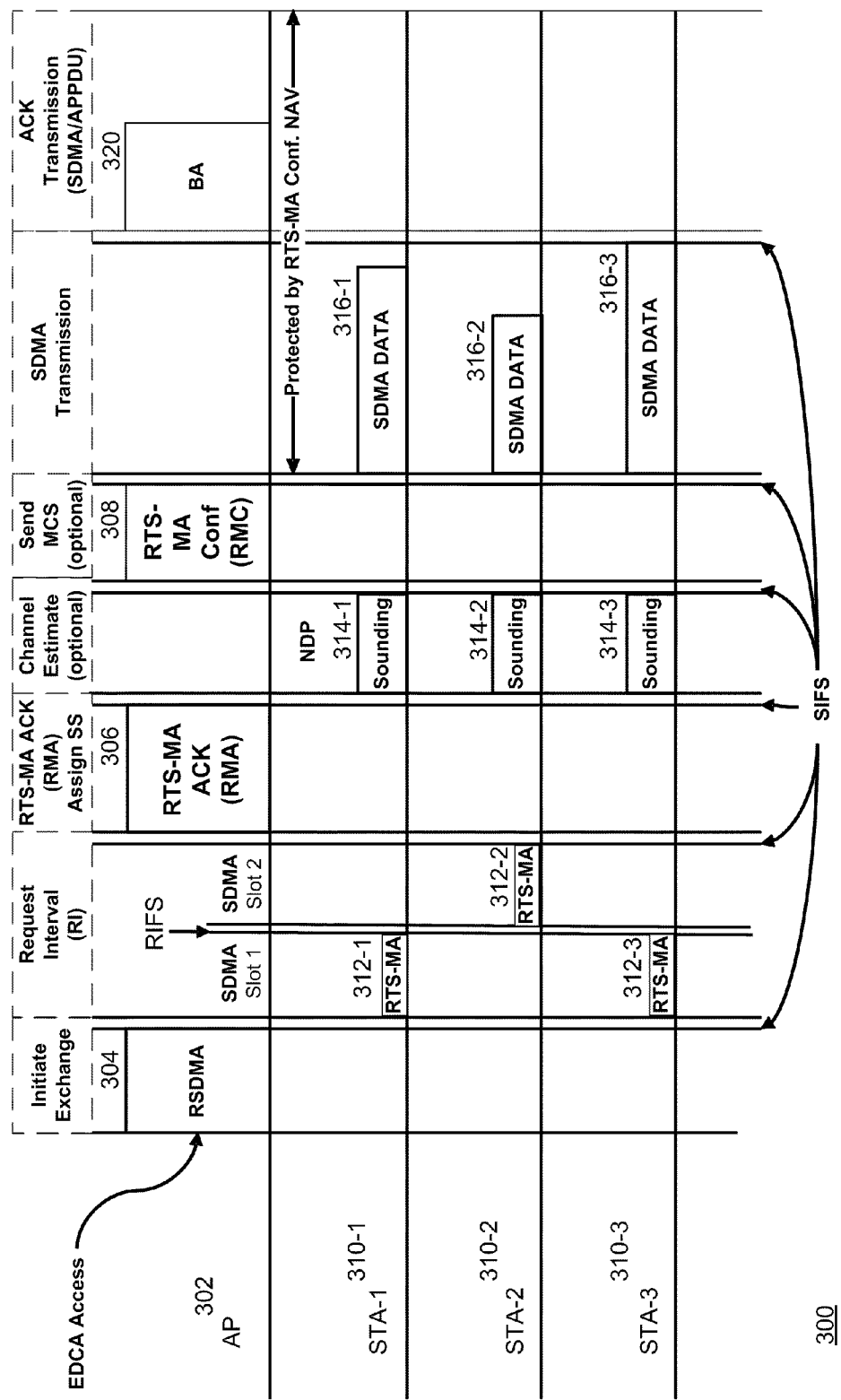
FIG. 3 is a timing diagram illustrating an uplink Spatial Division Multiple Access (SDMA) frame exchange sequence configured in accordance with one aspect of the disclosure.

FIG. 3 illustrates a timing diagram 300 that may be used to describe an AP-initiated uplink SDMA transmission process configured in accordance with one aspect of the disclosure where an AP, as illustrated by an AP 302, schedules an uplink transmission by a plurality of STAs, as illustrated by a plurality of STAs 310-1 to 310-3, to the AP 302. In accordance with one aspect of the disclosure, the operation of the AP 302 is illustrated by an AP uplink scheduling operation process 400 in FIG. 4. Similarly, the operation of each of the STAs of the plurality of STAs 310-1 to 310-3 will be illustrated by an STA uplink transmission process 500 in FIG. 500.

Figure 4:
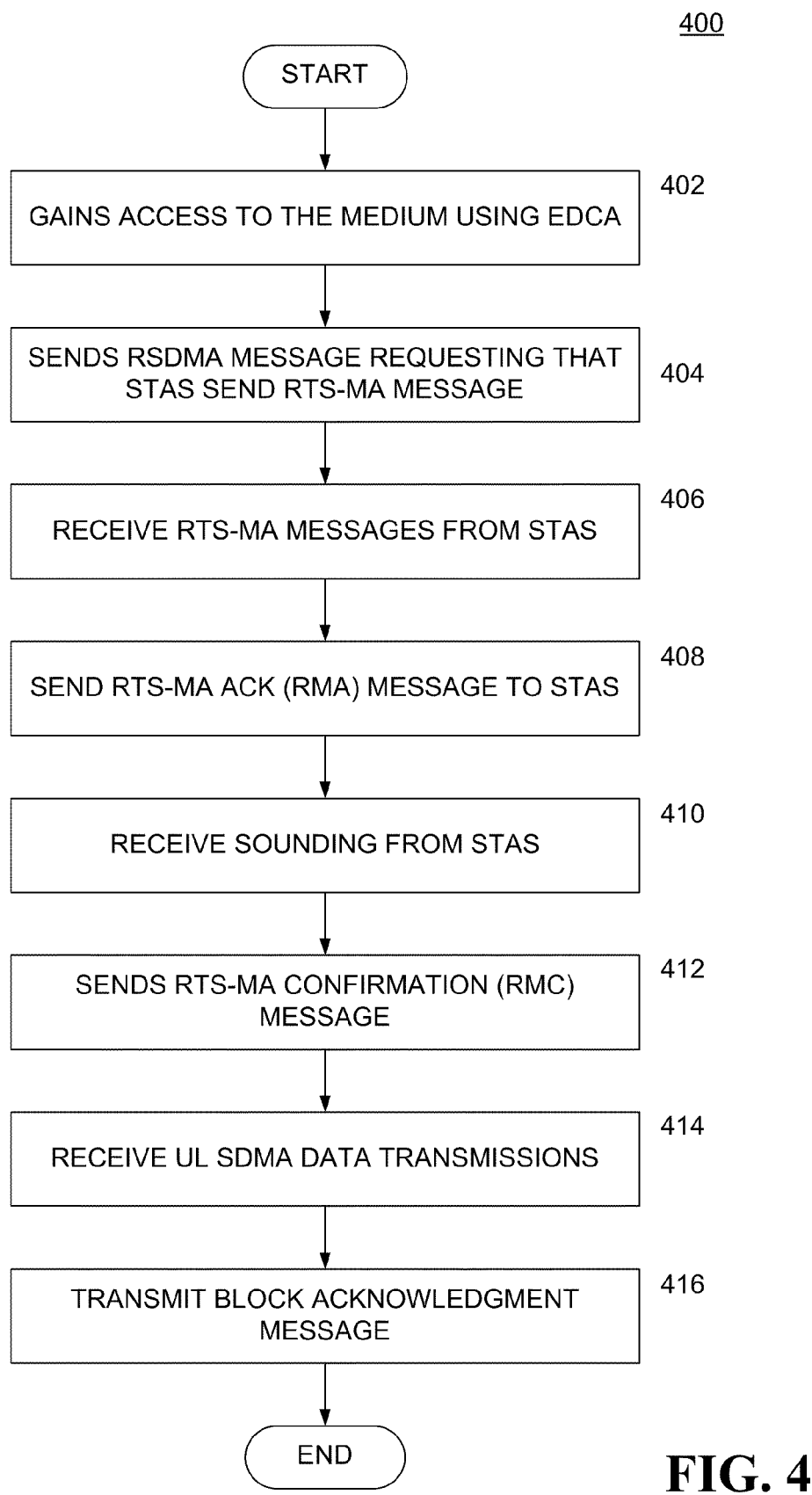
FIG. 4 is a flow diagram illustrating operation of an AP in the uplink SDMA frame exchange configured in accordance with one aspect of the disclosure.

Referring first to FIG. 4, in step 402, the AP 302 should gain access to the network medium so that it may begin to initiate an uplink SDMA transmission cycle. In one aspect of the disclosure, the AP 302 may gain access by contending with the plurality of STAs 310-1 to 310-3 to transmit on the medium. Once the AP 302 has gained access to the medium in step 402, operation continues with step 404.

In step 404, in one aspect of the disclosure, to initiate an uplink SDMA transmission session, the AP 302 sends out an RSDMA message, as illustrated by an RSDMA message 304. The RSDMA message 304 is used to solicit uplink requests from the plurality of STAs 310-1 to 310-3 during a period referred to as a Request Interval (RI). The RSDMA message 304 includes an assignment to the STAs of time-slots and spatial streams (SS) on which each STA will be able to transmit its uplink request. The destination address of the RSDMA message 304 is to set to a broadcast address.

In one aspect of the disclosure, each RSDMA message 304 is associated with an AC. The RSDMA message 304 is transmitted using the contention parameters of the class it is meant for pursuant to IEEE 802.11e, and the AIFS parameters for sending RSDMA are retained. An example RSDMA message format 600 used for the RSDMA message 304 is illustrated in FIG. 6. Although one example format is disclosed herein, as those skilled in the art will readily appreciate, the format may be changed depending on the particular application.

An example RSDMA message 600 is illustrated in FIG. 6. Although one example format is disclosed herein, as those skilled in the art will readily appreciate, the format may be changed depending on the particular application. In one aspect of the disclosure, the RSDMA message 600 is based on an IEEE 802.11 frame format and includes a Frame Control (FC) field 602 that provide frame control information; a Duration/ID field 604 that indicates the length of the message; a Destination Address (DA) field 606 for storing the destination address of the message, which as indicated above is the broadcast address; a Source Address (SA) field 608 that stores the identification of the sender of the message, which in this case is the AP; and a cyclic redundancy check (CRC) field 616 to allow recipients of the message to determine whether the message has been properly received. In addition to these fields, which are used for the transmission of the RSDMA message in the network, the RSDMA message 600 includes fields related to communicating parameters to the STAs for an uplink SDMA transmission.

For example, as the RSDMA message is used to inform STAs the parameters needed by each STA to effect an SDMA communication, the RSDMA message 600 may include a number of stations (#STAs) per slot field 610 that indicates the number of STAs that may request access to the network. The number of slots that are opened for request message transmission is determined by both the number of stations per slot parameter and the number of STAs that are supposed to respond to the RSDMA message.

The RSDMA message 600 also include a bitmap field 614 that is a mask to identify the STAs that need to respond to the RSDMA. FIG. 7 illustrates an example configuration 700 of the bitmap field 614 in the RSDMA message format 600. In the example configuration 700, the bitmap indicates that the STAs with an RTSMA-ID of 0, 1, 4, 7 . . . 250, 252, 253 and 255 are active and should respond to the RSDMA.

In one aspect of the disclosure, each STA is assigned an RTSMA-ID during its association with the AP. The RTSMA-ID may be recycled when a STA disassociates. The value of the RTSMA-ID is based on a maximum number of STAs that may be supported in an uplink SDMA transmission session. For example, in an uplink SDMA transmission session that can support up to 256 nodes, the RTSMA-ID is an 8-bit value. In this case, for ease of implementation, the RTSMA-ID may simply be made to be the least significant byte of the two-byte association ID (AID) that is assigned to each STA by the AP during the association process under the IEEE 802.11 standard.

The RSDMA message format 600 also includes a Max ID field 612 that indicates the highest RTSMA-ID of the STA that is to respond to the RSDMA. This value is used to optimize the size of the bitmap field 614, which has a maximum size of 256-bits in one aspect of the disclosure.

It should be noted that the use of the RSDMA message incurs overhead. For example, transmission of the RSDMA message from the AP and the response from the STAs use resources such as processing as well as transmission resources. Thus, when an RSDMA message should be sent most efficiently may be determined by the AP. In one aspect of the disclosure, the AP 302 may estimate how often an RSDMA message is to be sent from the transmission specification. The AP 302 may know that a few STAs have data to send, but would like to maximize the use of the available spatial degrees of freedom. Thus, the AP 302 may transmit RSDMA messages at a minimum rate and increases the rate as STAs begin using the RSDMA.

During an RSDMA transmission and response, the AP will gather information on a metric of the STAs connected to the AP. In one aspect of the disclosure, the metric corresponds to the buffer of each STA such as the buffer 262 of FIG. 2. The status of the buffer may be retrieved from QoS control header; a sounding frame; or any other suitable mechanism; an example of which is provided below. The AP may make a determination that uplink SDMA would lead to efficiency in transmission. Other factors to be considered, other than the number of outstanding packets to be transmitted in the buffer includes the efficiency gain/loss from using SDMA, as uplink SDMA incurs significant overhead; channel condition metrics received from the STAs; or meeting QoS requirements.

When the AP determines that there is sufficient uplink traffic for uplink SDMA, the AP may contend with the STAs to send an RSDMA. In one aspect of the disclosure, the RSDMA is sent using the contention parameters of the class for which it is meant; the AIFS parameter for sending RSDMA are retained, which helps to manage fairness between classes; and the CWMin factor for a data class i is reduced via the following formula:

$$\text{CWMin\_RSDMA}(i)=\text{floor}(\text{CWMin}(i)/\text{NumberOfSTAsWithData}(i)),$$

where CWMin_RSDMA(i) is the minimum contention window size for the SDMA transmission that is being reduced for the class; CWMin(i) is the minimum contention window size for the access class; and NumberOfSTAsWithData(i) is the number of the STAs with data to transmit. The floor function is a function that ensures the resulting value of the CWMin_RSDMA(i) is the lowest integer nearest the result.

The RSDMA message may be scheduled with EDCA rules to ensure fairness to non-SDMA terminals. The AP may use the buffer status at the STAs, which provides information about the data each STA has to transmit, to determine when RSDMA messages should be sent for a given class. In one aspect of the disclosure, the SDMA transmission has considerable overhead that may be amortized by scheduling several STAs. In other words, the resource overhead needed to schedule an uplink SDMA transmission operation from one STA may be reduced on a per-STA basis if multiple STAs are allowed to participate in the uplink SDMA transmission operation. By way of example and not limitation, if two STAs are allowed to transmit during the uplink SDMA transmission operation, then the overhead resources necessary to effect that operation per-STA may be reduced by ½ as compared to if only one STA is able to participate. If three STAs are allowed to transmit, then the per-STA overhead resources may be considered to be reduced by ⅓, and so forth. It should be noted that the actual overhead resource reduction may not follow a linear function.

Figure 5:
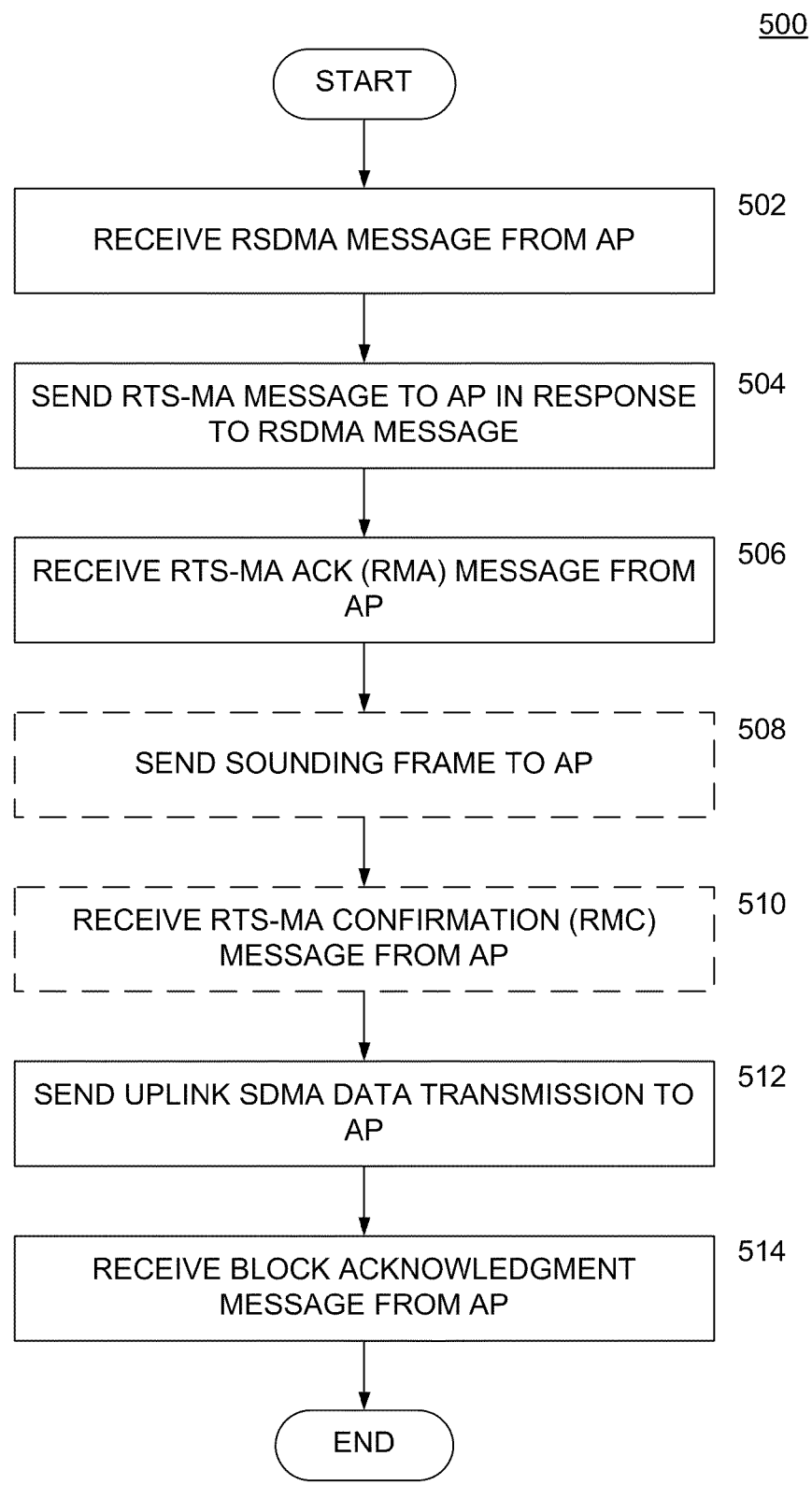
FIG. 5 is a flow diagram illustrating operation of an STA in the uplink SDMA frame exchange sequence configured in accordance with one aspect of the disclosure.

Referring to FIG. 5, in response to receiving the RSDMA message 304 in step 502, each STA identified in the RSDMA message 304 will send an uplink request by sending a Request to Send-Multiple Access (RTS-MA) message in step 504. As illustrated in FIG. 3, each STA of the plurality of STAs 310-1 to 310-3 will respond to the RSDMA message 304 with a respective RTS-MA message 312-1 to 312-3. The RTS-MA messages 312-1 to 312-3 are transmitted using the pre-assigned time-slots and spatial streams as previously determined by the AP 302 in step 404. In one aspect of the disclosure, each of these RTS-MA messages may contain an uplink traffic access class, an EDCA backoff counter value and a packet size for the STA, as further described herein.

In one aspect of the disclosure, to determine if it should transmit an RTS-MA message, an STA may check the bitmap field 614 of the RSDMA message and determine if the bit corresponding to its RTSMA-ID is 1. If so, then the STA has received an allocation and will transmit the RTS-MA message when requested. If the STA does not receive an allocation, then the STA is free to contend for its own transmission.

If an STA is to transmit an RTS-MA message, the STA may determine its slot number by counting the number of 1's that appeared until the current bit in the bitmap and the number of STAs per slot; and the spatial stream for RTS-MA transmission in a given slot is picked as the count of 1s in the current slot. For example, if the bitmap field is 001110010011011, with #STA per slot=4, this indicates that STAs 2, 3, 4 and 7 pick SS 1, 2, 3 and 4 in the slot-1 and the STAs 10, 11, 13 and 14 pick SS 1, 2, 3 and 4 in the slot-2.

Figure 8:
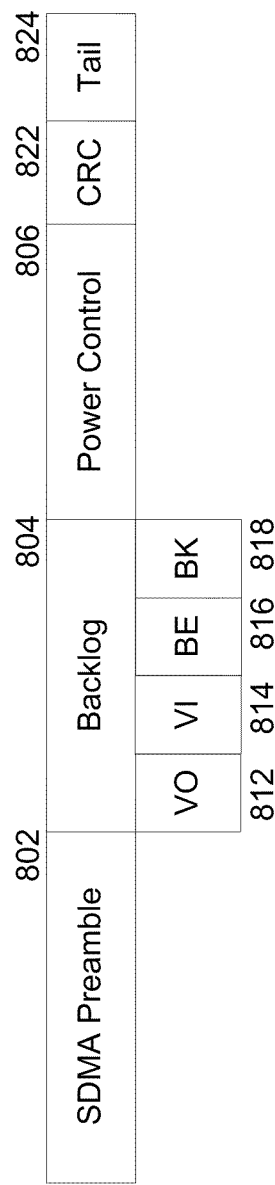
FIG. 8 illustrates an example of a Request To Send-Multiple Access (RTS-MA) frame format that may be used in the uplink SDMA frame exchange sequence.

In step 406, the AP 302 receives the RTS-MA messages 312-1 to 312-3 from the STA-1 310-1 to STA-3 310-3, respectively. An example of an RTS-MA message format 800 is illustrated in FIG. 8. The RTS-MA message may also be used by the AP to estimate the range of an STA as well as determine the amount of data each STA has to send. In one aspect of the disclosure, the AP 302 may require all RTS-MAs to be sent with extended cyclic prefixes to enable accurate ranging estimation.

The RTS-MA message 800 includes an SDMA preamble portion 802. In one aspect of the disclosure, the length of the SDMA preamble portion 802 is determined by the spatial stream allocation specified by the AP 302. The RTS-MA frame 800 also includes an uplink traffic backlog field 804. The information contained in the uplink traffic backlog field 804 enables the AP 302 to schedule uplink traffic epochs by informing the AP 302 of the buffer status of the STA. In one aspect of the disclosure, the buffer information of the STA contained in the uplink traffic backlog is presented on a per class basis, including a VOice (VO) field 812, a VIdeo (VI) field 814, a Best Effort (BE) field 816, and background (BK) field 818.

The RTS-MA frame 800 also includes a power control field 806. The transmit power information contained in the power control field 806 is provided by the STA so that the AP 302 can adjust the power of its transmissions to the STA.

The RTS-MA frame 800 further includes a CRC field 822 that may be used for error correction, and a tail field 824 is also included to ensure the RTS-MA frame 800 is of a certain size.

In step 408, the AP 302 may broadcast an RTS-MA Acknowledgement (RMA) message 306 using the broadcast address that signals to all STAs to receive and decode the message, which is received by each STA in step 506. The RMA message 306 acknowledges the receipt of the RTS-MA messages 312-1 to 312-3 and informs the STAs 310-1 to 310-3 their spatial stream allocation. In one aspect of the disclosure, when the RMA message 306 allocates more than one spatial stream to a subset of the STAs, then a training request may optionally be added to the RMA message to create an RMA-TRM message. The sounding may be used for optimizing uplink SDMA modulation and coding scheme (MCS) calculations.

Figure 9:
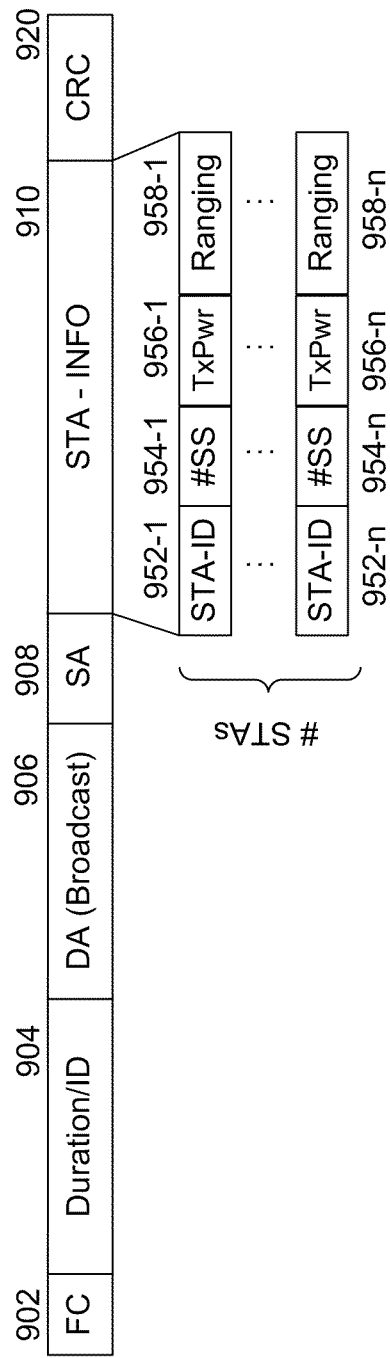
FIG. 9 illustrates an example of a RTS-MA Acknowledgement (RMA) frame format that may be used in the uplink SDMA frame exchange sequence.

An example of the RMA message format 900 is given in FIG. 9. However, as those skilled in the art will readily appreciate, the format may be changed depending on the particular application. The RMA message format 900 may be used to acknowledge every RTS-MA message that was sent. Note that nodes that use RTS-MA messages for ranging purposes also need to know that their RTS-MA message was received. As noted above, the RMA message 900 contains an assignment of spatial streams and MCS to the STAs. The RMA message 900 may also be used to assign post backoff counter values to the STAs, as further described herein. The RMA message format 900 contains the spatial stream allocations for the STAs that are selected for uplink SDMA data transmission in an STA-INFO field 910. The RMA message format 900 contains STA-ID fields 952-1 to 952-n that identifies the STAs referenced in the transmission, as well as number of spatial stream (#SS) fields 954-1 to 954-n assigning the spatial streams to the STA. The RMA message format 900 also includes transmit power level fields 956-1 to 956-n that includes transmit power levels for each STA estimated using the closed loop power control by using the CSI obtained from the received RTS-MA messages 312-1 to 312-3. Further, the RMA message format 900 contains ranging bit fields 958-1 to 958-n that include ranging bits for each STA to indicate a timing delay message for the uplink transmissions from the STA. If each STA is allocated exactly one spatial stream, then the RMA message 900 will also contains the MCS allocation for each station. With a single stream for each STA, STAs will send data in response to the RMA.

In one aspect of the disclosure, the RMA message format 900 also includes a Frame Control (FC) field 902 that provides control parameters of the RMA message; a Duration/ID 904 that indicates the length of the message; a Destination Address (DA) field 906, which as indicated above is the broadcast address; a Source Address (SA) field 908 that identifies the sender of the message, which in this case is the AP 302; and a cyclic redundancy check (CRC) field 920 to allow recipients to determine whether the message has been properly received.

Referring back to FIG. 3, after the RMA message 900 has been transmitted, the STAs may proceed with uplink transmission. In one aspect of the disclosure, an additional step may occur before the uplink transmission occurs, which is that the AP 302 may query STAs 310-1 to 310-3 to obtain accurate channel state information. Obtaining channel state information is a valuable part of the SDMA protocol because spatial streams should be formed in such a configuration so that a stream targeted at a particular wireless node from another wireless node may be seen as low power interference at other wireless nodes. To facilitate the formation of non-interfering streams, the transmitting node may use the channel state information from each of the receiving wireless nodes. In one aspect of the disclosure, a transmitting node such as the AP 302 may solicit channel sounding by broadcasting a request message to all the nodes in the network indicating that the channel state information needs to be estimated. The request message may also be sent only to those nodes that are potential SDMA transmission recipients. In this example, the request message may be transmitted to the plurality of STAs 310-1 to 310-3 as they are all potential recipients of a transmission. This request may be a part of an RMA message such as the RMA message 306 or a specific message referred to as a Training Request Message.

Referring back to FIG. 5, in step 508, an STA's response to the AP 302's RMA-TRM message is a sounding frame that is formatted according to the number of streams allocated to the STAs 310-1 to 310-3. These sounding frames 314-1 to 314-3 are received by the AP 302 to provide CSI. Having precise channel state information assists in precise MCS allocation, which is important for utilizing higher modulation schemes. As further detailed below, the MCS may be later fed-back to the STAs 310-1 to 310-3 using an RMC message. The AP 302 may then estimate the joint channel to the desired STAs from the received sounding frames. In this case, it is assumed that the channel is reversible, which means the uplink channel condition is similar to the downlink channel condition.

Figure 10:
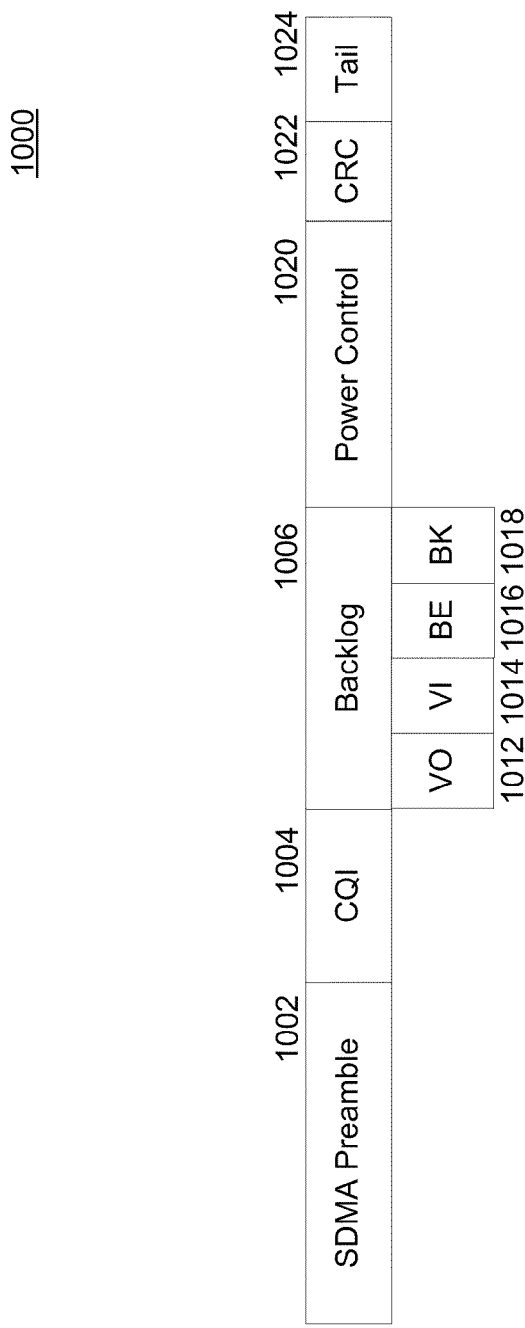
FIG. 10 is a diagram of an example format of a sounding frame that may be sent in response to the RMA frame of FIG. 9.

FIG. 10 illustrates a sounding frame format 1000 that may be sent by the STAs in response to the request from the AP. The sounding frame 1000 includes an SDMA preamble portion 1002, the length of which is determined by the spatial stream allocation. In order for the STA to report its measured channel quality, the sounding frame format 1000 provides a Channel Quality Indicator (CQI) field 1004, which contains an average of the received SNR for all receive antennas and tones based on a received message at the STA. The information contained in the CQI field 1004 enables the scheduler to estimate the post detection signal to interference/noise ratio (SINR) and assign appropriate transmission rates for responding STAs. As known by those skilled in the art, interference and noise may be determined by the STA measuring a level of ambient noise surrounding the receiver during a quiet period.

The sounding frame 1000 includes an uplink traffic backlog field 1006 that may enable the AP to schedule uplink transmissions by facilitating the scheduler in creating a schedule that maximizes the use of resources, thereby optimizing performance of the MAC protocol. In one aspect, the uplink traffic backlog is presented on a per class basis, and VO (voice), VI (video), BE (best effort), and BK (background) fields 1012-1018 denote four classes.

Further, the sounding frame 1000 includes a power control field 1020 that may be used by the STA to provide feedback to allow the AP to increase or decrease the amount of power at which transmissions occur from the AP to the particular STA. A CRC field 1022, which may be used by the AP for error detection and correction; and a tail field 1024, which may be used to fill the length of the frame as needed is also included.

In step 410, the AP 302 receives a response of a plurality of sounding frames 314-1 to 314-3 from the STAs 310-1 to 310-3, respectively, to the RMA-TRM message. Based on the received sounding frames, the AP 302 can create an RTS-MA Confirmation (RMC) message 308 and send it to the STAs 310-1 to 310-3 to improve communication signal quality.

In step 412, the AP 302 sends the RMC message 308, which includes a spatial stream assignment, a modular and coding scheme, and any power offset values required for uplink SDMA for selected STAs, which is received by the selected STAs as indicated in step 510 of FIG. 5. In one aspect of the disclosure, these STAs are selected to preferably preserve their EDCA priorities, based on their respective backoff counter values and ACs. Thus, the AP 302 will select STAs to add to the list of STAs that are allowed to send uplink transmission. The RMC message 308 also reserves the medium for a duration, which is a time period needed to perform a transmission operation. The duration may be based on longest packet size requested by the selected STAs.

Figure 11:
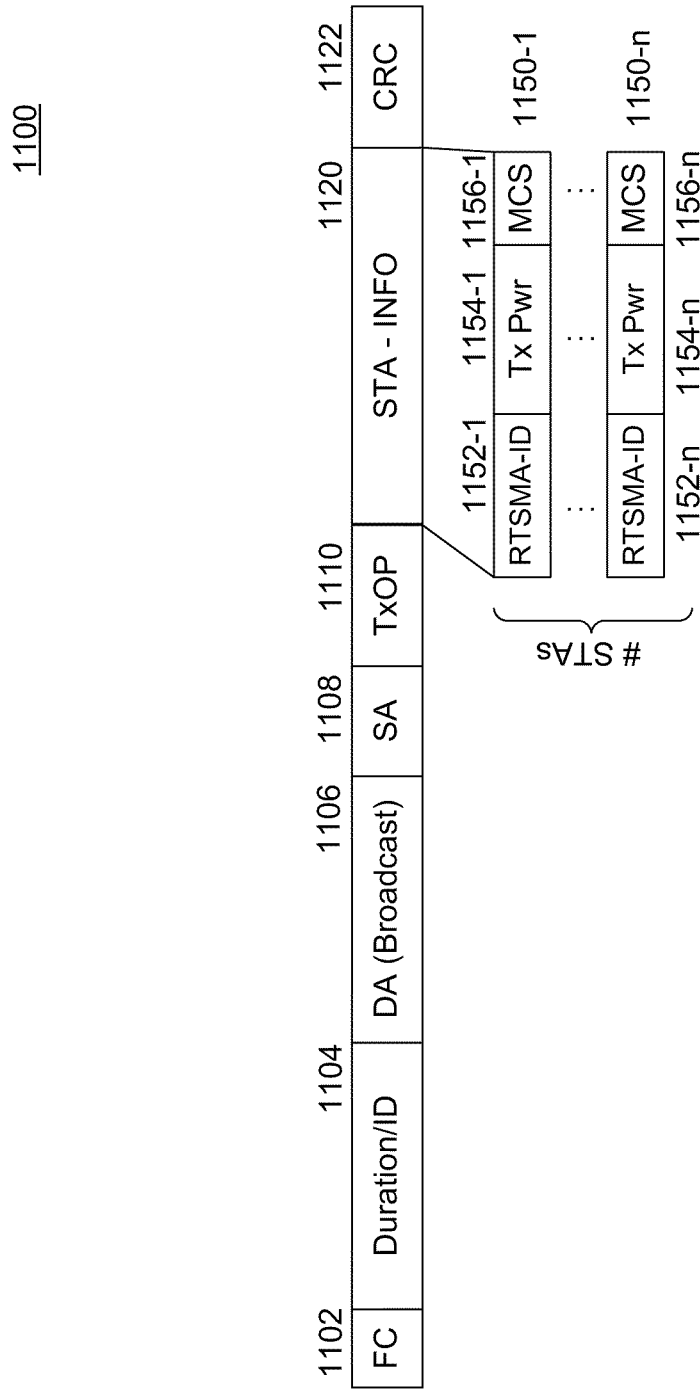
FIG. 11 illustrates an example of a RTS-MA Confirmation (RMC) frame format that may be used in the uplink SDMA frame exchange sequence.

An example of an RMC message 1100 for the RMC message 308 is illustrated in FIG. 11. However, as those skilled in the art will readily appreciate, the format may be changed depending on the particular application. The RMC message 1100 includes a Duration/ID field 1104 for reserving the medium to allow the uplink transmission, which is the period that specifies the transmission time required for the STAs selected for uplink transmission. In one aspect of the disclosure, the duration of the SDMA transmission is determined by the STA's uplink transmit power. The STAs listening on the medium may decipher the Duration/ID field 1104 and set their Network Access Vector (NAV), which is an indicator for the STA on how long it must defer from accessing the medium.

The RMC message 1100 includes a transmission opportunity (TxOP) field 1110, which is a bounded time interval in which STAs supporting QoS are permitted to transfer a series of frames. In one aspect of a disclosure, the TXOP is defined by a start time and a maximum duration, is a bounded time interval during which a station may transmit as many frames as possible, as long as the duration of the transmissions does not extend beyond the maximum duration of the value contained in the TXOP field 1110.

It should be noted that the previous RTS-MA transmission was carried out using open loop power control, where the AP does not receive feedback about its transmission power from the STAs. In contrast, the use of sounding and the uplink SDMA data transmissions will use closed loop power control. The transmit power information for the sounding frame is provided by an RMA message and the power control information for the data frames is provided by an RMC message. Previously, the AP has estimated the joint channel and calculated MCS allocation as well as fine grained power control to be used for uplink SDMA data transmission by a plurality of STAs 1150-1 to 1150-$n$. The MCS allocation and fine grained power control is contained in a STA-INFO field 1120 that includes several sub-fields, which includes a plurality of RTSMA-ID fields 1152-1 to 1152-$n$. The RTSMA-ID fields 1152-1 to 1152-$n$ may be used by the plurality of STAs 1150-1 to 1150-$n$ to identify the transmit power control and MCS calculated by the AP for them. The transmit power control may be sent to the STAs in transmit power fields 1154-1 to 1154-$n$. The MCS allocation is sent to the STAs in MCS fields 1156-1 to 1156-$n$. Consequently, the STAs may send uplink SDMA data with the correct MCS and power settings using the information contained in the RMC message.

In one aspect of the disclosure, in addition to the above fields, which are used for the transmission of the RMC message in the network, the RMC message 1100 includes fields also based on the IEEE 802.11 MAC frame format. These include a Frame Control (FC) field 1102 that indicates the control frame; a Destination Address (DA) field 1106, which is the broadcast address to all STAs; a Source Address (SA) field 1108 that identifies the sender of the message, which in this case is the AP 302; and a cyclic redundancy check (CRC) field 1122 to allow recipients to determine whether the message has been properly received.

In step 512, the STAs 310-1 to 310-3 will transmit uplink SDMA packets; illustrated as SDMA data transmissions 316-1 to 316-3, respectively, using the spatial stream, MCS and power offset values as determined by the AP 302 and received in the RMC message. The AP 302 will receive the uplink SDMA transmissions in step 414.

In step 416, once the AP 302 has successfully received the UL SDMA packets, the AP 302 responds with a Block ACK (BA) message 320 to acknowledge the transmission from the STAs, which will be received by the STAs 310-1 to 310-3 in step 514.

For an STA that received the RSDMA message and signaled it data to send using an RTS-MA message, if the STA receives an allocation, then the STA transmits data and then moves into post backoff after transmission. Further, access to the medium is provided based on a priority depending on an uplink traffic access class, also referred to an access category, from the plurality of STAs 310-1 to 310-3. The post backoff is where each STA will not vie for contention of the medium after a transmission and allows all STAs to decrement their backoff counters post a transmission. In one aspect of the disclosure, after a successful transmission of the uplink SDMA packets, the STAs may rely on scheduled RSDMA or RTS-MA Confirmation messages for future uplink transmissions. The STAs may also re-initialize their backoff counters for EDCA access for uplink traffic. However, if all nodes choose their own backoff count and begin post backoff immediately after the BA, there will be an increased probability of collisions as there are a higher number of STAs in the SDMA transmission scheme.

In one aspect of the disclosure, one approach to attempt to reduce the probability of collisions during post backoff is that the AP may instruct STAs not to contend. In this case, the AP determines if the STAs have further data to send for the uplink data received. For example, the AP may send the instruction during the BA. The STAs may then wait for further allocations from the AP. However, a per class "time out" will be defined for the STAs so that if the STAs do not receive an allocation within the time out, the STAs are free to contend again.

In another aspect of the disclosure, for another approach to post backoff the AP may assign a backoff value to each STA. If the number of scheduled STAs is less than CWMin, the minimum contention window, then each STA is assigned a distinct value from a randomly sorted array of numbers between 1 and CWMin. If the number of scheduled STAs is greater than CWMin, then each STA is assigned a distinct value from a randomly sorted array of numbers according to the following formula:

$$STA(i)=Array[1 \ldots \text{No. of STAs}*\alpha]$$

where $\alpha$ is a number greater than 1 and "No. of STAs" is the number of STAs scheduled for transmission.

Figure 12:
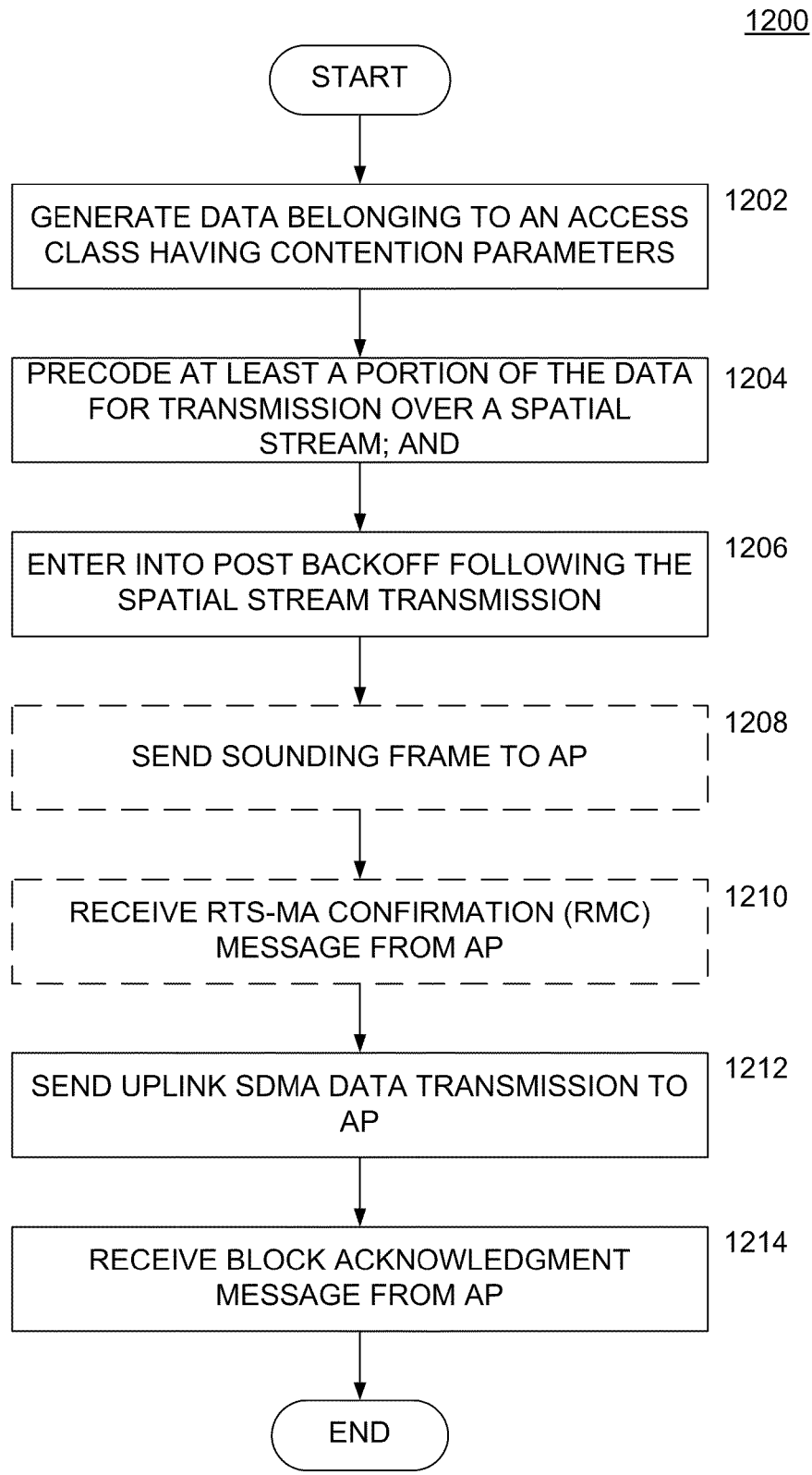
FIG. 12 is a flow diagram illustrating an uplink transmission with post backoff process that may be used in the uplink SDMA frame exchange sequence.

FIG. 12 illustrates illustrating an uplink transmission with post backoff process 1200 implemented on the STAs that may be used in the uplink SDMA frame exchange sequence. In step 1202, during a uplink SDMA process, the STAs generate data belonging to an access class having contention parameters. In step 1204, the STA precodes at least a portion of the data for transmission over a spatial stream to the AP. Then, in step 1206, the STA enters into post backoff following the spatial stream transmission.

Figure 13:
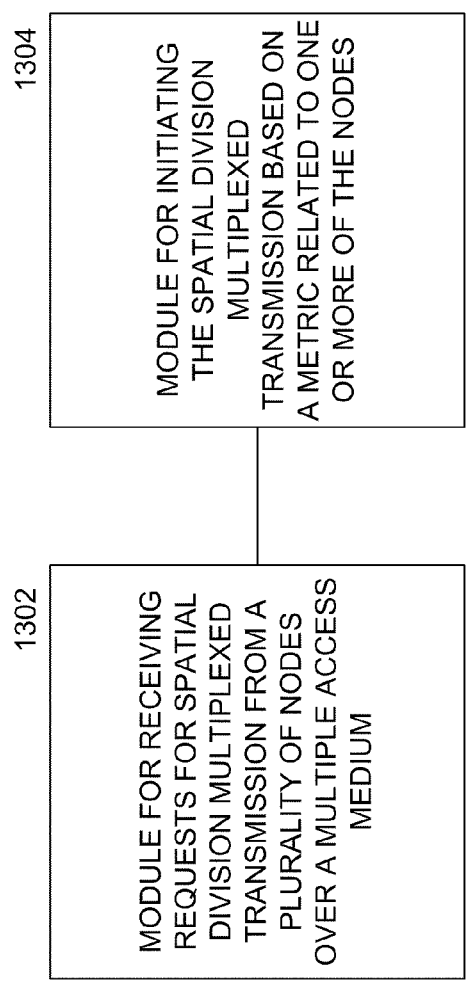
FIG. 13 is a diagram illustrating the functionality of one configuration of an apparatus in accordance with one aspect of the disclosure.

FIG. 13 is a diagram illustrating the functionality of one configuration of an apparatus in accordance with one aspect of the disclosure. The apparatus includes a module for receiving a spatial division multiplexed transmission from a plurality of nodes over a multiple access medium, and a module for initiating the spatial division multiplexed transmission based on a metric related to one or more of the nodes.

Figure 14:
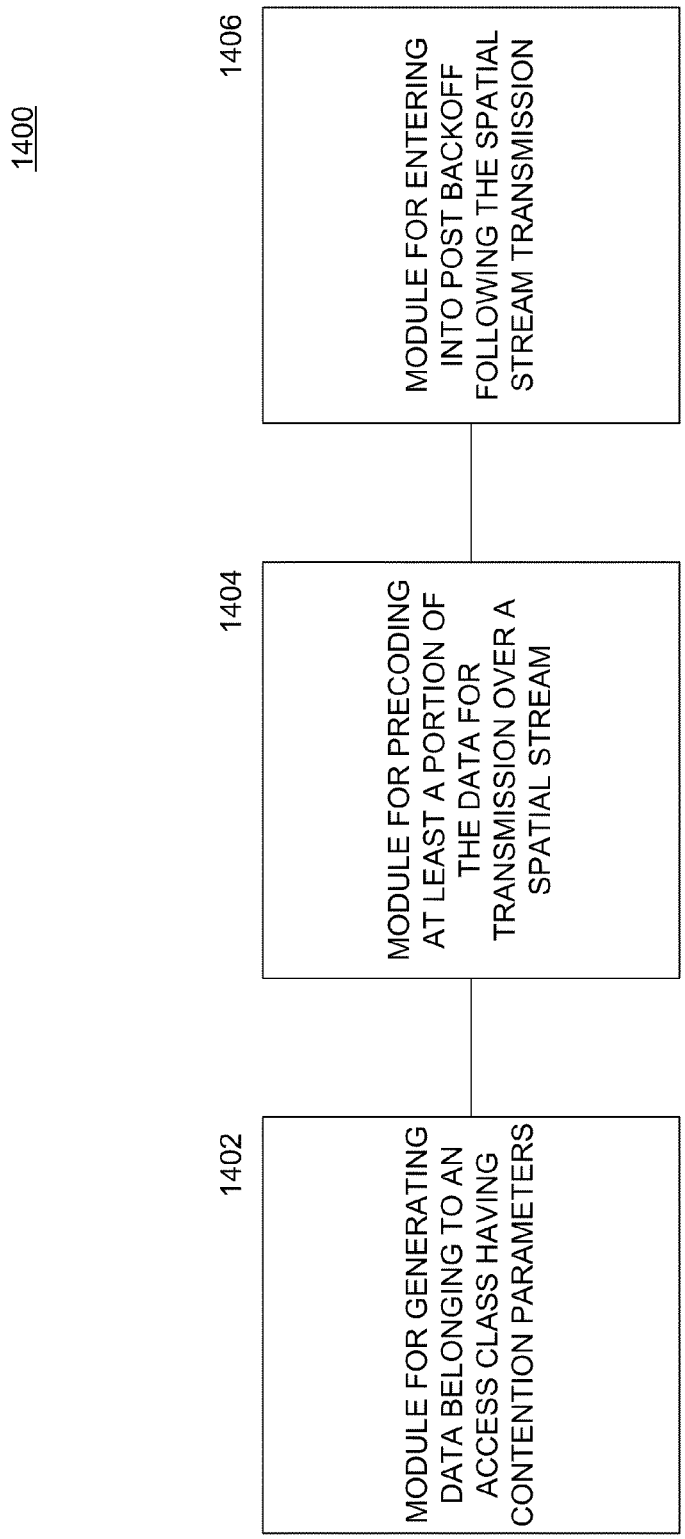
FIG. 14 is a diagram illustrating the functionality of another configuration of an apparatus in accordance with one aspect of the disclosure.

FIG. 14 is a diagram illustrating the functionality of another configuration of an apparatus in accordance with one aspect of the disclosure. The apparatus includes a module for generating data belonging to an access class having contention parameters, a module for precoding at least a portion of the data for transmission over a spatial stream, and a module for entering into post backoff following the spatial stream transmission.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communication, comprising:
a plurality of antennas; and
a processing system configured to:
contend for access to a multiple access medium using a minimum contention window size that is equal to a number based on a minimum contention window size for an access class divided by a number of a plurality of nodes with data to transmit that belongs to the access class;
transmit a request spatial division multiple access (RSDMA) message identifying the plurality of nodes to transmit a request to send a spatial division multiplexed transmission;
allocate a plurality of slots for receiving requests to send a spatial division multiplexed transmission from the plurality of nodes;
receive the requests to send a spatial division multiplexed transmission from one or more of the plurality of nodes over the multiple access medium; and
initiate spatial division multiplexed transmission from the one or more of the plurality of nodes based on a metric related to the one or more of the plurality of nodes.

2. The apparatus of claim 1, wherein the plurality of nodes is identified by a bitmap in the RSDMA message.

3. The apparatus of claim 1, wherein the metric comprises an amount of data to be transmitted by each of the one or more of the plurality of nodes.

4. The apparatus of claim 1, wherein the processing system is further configured to determine the metric based on the amount of data stored in a buffer at each of the one or more of the plurality of nodes.

5. The apparatus of claim 1, wherein the metric comprises channel state information for each of the one or more of the plurality of nodes.

6. The apparatus of claim 1, wherein the metric comprises at least one of a quality of service or priority-based requirement for each of the one or more of the plurality of nodes.

7. The apparatus of claim 1, wherein data to be transmitted by each of the plurality of nodes belongs to the access class.

8. The apparatus of claim 1, wherein the processing system is further configured to broadcast a message to allocate spatial streams to each of the one or more of the plurality of nodes.

9. The apparatus of claim 1, wherein the processing system is further configured to signal other nodes not involved in the spatial division multiplexed transmission to defer their transmissions for the duration of the spatial division multiplexed transmission.

10. The apparatus of claim 1, wherein the processing system is further configured to signal other nodes not involved in the spatial division multiplexed transmission in compliance with legacy nodes that do not support spatial division multiplexed transmission.

11. The apparatus of claim 2, wherein each bit in the bitmap is associated with a node in the plurality of nodes and comprises an indication that the node will request transmission.

12. The apparatus of claim 7, wherein the minimum contention window size is less than the minimum contention window size for the access class.

13. The apparatus of claim 8, wherein the processing system is further configured to receive a sounding frame from each of the one or more of the plurality of nodes to compute channel state information to enable the processing system to separate data from the spatial streams.

14. The apparatus of claim 8, wherein the processing system is further configured to receive data from each of the one or more of the plurality of nodes on the allocated spatial streams.

15. The apparatus of claim 14, wherein the processing system is further configured to transmit an acknowledgement in response to receiving the data from each of the one or more of the plurality of nodes on the allocated spatial streams.

16. An apparatus for wireless communications, comprising:
    means for contending for access to a multiple access medium using a minimum contention window size that is equal to a number based on a minimum contention window size for an access class divided by a number of a plurality of nodes with data to transmit that belongs to the access class;
    means for transmitting a request spatial division multiple access (RSDMA) message identifying the plurality of nodes to transmit a request to send a spatial division multiplexed transmission;
    means for allocating a plurality of slots for receiving requests to send a spatial division multiplexed transmission from the plurality of nodes;
    means for receiving the requests to send a spatial division multiplexed transmission from one or more of the plurality of nodes over the multiple access medium; and
    means for initiating spatial division multiplexed transmission from the one or more of the plurality of nodes based on a metric related to the one or more of the plurality of nodes.

17. The apparatus of claim 16, wherein the plurality of nodes is identified by a bitmap in the RSDMA message.

18. The apparatus of claim 16, wherein the metric comprises an amount of data to be transmitted by each of the one or more of the plurality of nodes.

19. The apparatus of claim 16, wherein the metric comprises channel state information for each of the one or more of the plurality of nodes.

20. The apparatus of claim 16, wherein the metric comprises at least one of a quality of service or priority-based requirement for each of the one or more of the plurality of nodes.

21. The apparatus of claim 16, wherein data to be transmitted by each of the plurality of nodes belongs to the access class.

22. The apparatus of claim 16, further comprising means for broadcasting a message to allocate spatial streams to each of the one or more of the plurality of nodes.

23. The apparatus of claim 16, further comprising means for signaling other nodes not involved in the spatial division multiplexed transmission to defer transmissions for the duration of the spatial division multiplexed transmission.

24. The apparatus of claim 16, further comprising means for signaling other nodes not involved in the spatial division multiplexed transmission in compliance with legacy nodes that do not support spatial division multiplexed transmission.

25. The apparatus of claim 17, wherein each bit in the bitmap is associated with a node in the plurality of nodes and comprises an indication that the node will request transmission.

26. The apparatus of claim 18, further comprising means for determining the metric based on the amount of data stored in a buffer at each of the one or more of the plurality of nodes.

27. The apparatus of claim 21, wherein the minimum contention window size is less than the minimum contention window size for the access class.

28. The apparatus of claim 22, further comprising means for receiving a sounding frame from each of the one or more of the plurality of nodes to compute channel state information to enable the data to be separated from the spatial streams.

29. The apparatus of claim 22, further comprising means for receiving data from each of the one or more of the plurality of nodes on the allocated spatial streams.

30. The apparatus of claim 29, further comprising means for transmitting an acknowledgement in response to receiving the data from each of the one or more of the plurality of nodes on the allocated spatial streams.

31. A method for wireless communications, comprising:
    contending for access to a multiple access medium using a minimum contention window size that is equal to a number based on a minimum contention window size for an access class divided by a number of a plurality of nodes with data to transmit that belongs to the access class;
    transmitting a request spatial division multiple access (RSDMA) message identifying the plurality of nodes to transmit a request to send a spatial division multiplexed transmission;
    allocating a plurality of slots for receiving requests to send a spatial division multiplexed transmission from the plurality of nodes;
    receiving the requests to send a spatial division multiplexed transmission from one or more of the plurality of nodes over the multiple access medium; and
    initiating spatial division multiplexed transmission from the one or more of the plurality of nodes based on a metric related to the one or more of the plurality of nodes.

32. The method of claim 31, wherein the plurality of nodes is identified a bitmap in the RSDMA message.

33. The method of claim 31, wherein the metric comprises an amount of data to be transmitted by each of the one or more of the plurality nodes.

34. The method of claim 31, wherein the metric comprises channel state information for each of the one or more of the plurality of nodes.

35. The method of claim 31, wherein the metric comprises at least one of a quality of service or priority-based requirement for each of the one or more of the plurality of nodes.

36. The method of claim 31, wherein data to be transmitted by each of the plurality of nodes belongs to the access class.

37. The method of claim 31, further comprising broadcasting a message to allocate spatial streams to each of the one or more of the plurality of nodes.

38. The method of claim 31, further comprising signaling other nodes not involved in the spatial division multiplexed transmission to defer transmissions for the duration of the spatial division multiplexed transmission.

39. The method of claim 31, further comprising signaling other nodes not involved in the spatial division multiplexed transmission in compliance with legacy nodes that do not support spatial division multiplexed transmission.

40. The method of claim 32, wherein each bit in the bitmap is associated with a node in the plurality of nodes and comprises an indication that the node will request transmission.

41. The method of claim 33, further comprising determining the metric based the amount of data stored in a buffer at each of the one or more of the plurality of nodes.

42. The method of claim 36, wherein the minimum contention window size that is less than the minimum contention window size for the access class.

43. The method of claim 37, further comprising receiving a sounding frame from each of the one or more of the plurality of nodes to compute channel state information to enable the data from the spatial streams to be separated.

44. The method of claim 37, further comprising receiving data from each of the one or more of the plurality of nodes on the allocated spatial streams.

45. The method of claim 44, further comprising transmitting an acknowledgement in response to receiving the data from each of the one or more of the plurality of nodes on the allocated spatial streams.

46. A computer-program product for communication comprising:
   a non-transitory machine-readable medium encoded with instructions executable to:
   contend for access to a multiple access medium using a minimum contention window size that is equal to a number based on a minimum contention window size for an access class divided by a number of a plurality of nodes with data to transmit that belongs to the access class;
   transmit a request spatial division multiple access (RS-DMA) message identifying the plurality of nodes to transmit a request to send a spatial division multiplexed transmission;
   allocate a plurality of slots for receiving requests to send a spatial division multiplexed transmission from the plurality of nodes;
   receive the requests to send a spatial division multiplexed transmission from one or more of the plurality of nodes over the multiple access medium; and
   initiate spatial division multiplexed transmission from the one or more of the plurality of nodes based on a metric related to the one or more of the plurality of nodes.

47. An access point comprising:
   a plurality of antennas;
   a processing system configured to:
   contend for access to a multiple access medium using a minimum contention window size that is equal to a number based on a minimum contention window size for an access class divided by a number of a plurality of nodes with data to transmit that belongs to the access class;
   transmit a request spatial division multiple access (RS-DMA) message identifying the plurality of nodes to transmit a request to send a spatial division multiplexed transmission;
   allocate a plurality of slots for receiving requests to send a spatial division multiplexed transmission from the plurality of nodes;
   receive the requests to send a spatial division multiplexed transmission from one or more of the plurality of nodes over the multiple access medium; and
   initiate spatial division multiplexed transmission from the one or more of the plurality of nodes based on a metric related to the one or more of the plurality of nodes; and
   a transceiver configured to interface the processing system to the medium through the antennas.

* * * * *